(12) United States Patent
Warnes

(10) Patent No.: US 10,411,602 B2
(45) Date of Patent: Sep. 10, 2019

(54) MULTIPURPOSE POWER SUPPLY FOR POWER SWITCH DRIVER APPLICATIONS

(71) Applicant: Murata Manufacturing Co., Ltd., Nagaokakyo-shi, Kyoto-fu (JP)

(72) Inventor: Frank Warnes, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/046,023

(22) Filed: Jul. 26, 2018

(65) Prior Publication Data

US 2018/0337609 A1 Nov. 22, 2018

Related U.S. Application Data

(63) Continuation of application No. 14/855,560, filed on Sep. 16, 2015.

(30) Foreign Application Priority Data

Sep. 19, 2014 (GB) .................................. 1416596.3

(51) Int. Cl.
  *H02M 3/335* (2006.01)
  *H02M 1/088* (2006.01)
  *H02M 1/00* (2006.01)

(52) U.S. Cl.
  CPC ....... *H02M 3/33507* (2013.01); *H02M 1/088* (2013.01); *H02M 3/33561* (2013.01); *H02M 2001/008* (2013.01); *H02M 2001/0048* (2013.01); *Y02B 70/1483* (2013.01); *Y02B 70/1491* (2013.01)

(58) Field of Classification Search
  CPC ...... H02M 3/33561; H02M 1/08; H02M 7/04; H02M 1/088; H02M 3/33507; H02M 2001/0048; H02M 2001/008; H02M 2001/007; H02M 2001/0077; H02M 3/285; H02M 3/1584; Y02B 70/1483; Y02B 70/1491
  See application file for complete search history.

(56) References Cited

U.S. PATENT DOCUMENTS 5,162,663 A * 11/1992 Combs .................... H02J 9/061
   307/29
2010/0109434 A1 * 5/2010 Kyono .............. H02M 3/33561
   307/31

(Continued)

OTHER PUBLICATIONS

Warnes, "Multipurpose power supply for power switch driver applications" U.S. Appl. No. 14/855,560, filed Sep. 16, 2015.

*Primary Examiner* — Gustavo A Rosario-Benitez
(74) *Attorney, Agent, or Firm* — Keating & Bennett, LLP

(57) ABSTRACT

A multipurpose power supply suitable for a power switch driver circuit takes an input voltage and generates output voltages at four output terminals. Two output terminals may be connected to voltage supply rails to drive a switched-mode power converter. The voltage output at each output terminal relative to ground is different, allowing the voltage rails to be set to voltages suitable for a variety of different power-switch driver circuits by adjusting the output terminals to which the voltage rails are connected. A reference voltage is applied to one output terminal in order to set the values of the voltages at the remaining output terminals.

14 Claims, 4 Drawing Sheets

(56) References Cited

U.S. PATENT DOCUMENTS

| | | | |
|---|---|---|---|
| 2011/0002146 A1* | 1/2011 | Kyono | H02M 3/33507 |
| | | | 363/21.12 |
| 2011/0084949 A1* | 4/2011 | Chiu | H02M 3/33561 |
| | | | 345/211 |
| 2011/0211376 A1* | 9/2011 | Hosotani | H02M 3/33523 |
| | | | 363/97 |
| 2014/0328088 A1* | 11/2014 | Wang | H02M 3/33561 |
| | | | 363/21.08 |
| 2015/0357919 A1* | 12/2015 | Russell | H01R 31/065 |
| | | | 363/21.12 |
| 2016/0344218 A1* | 11/2016 | Zhang | H02J 7/045 |

* cited by examiner

|  | IGBT | SIC | MOSFET |
|---|---|---|---|
| 210 +15V | +15V supply | +20V supply | +15V supply |
| 220 +5V | 0V reference | --- | 0V reference |
| 230 +5V | --- | 0V reference | -5V supply |
| 240 | -10V supply | -5V supply | --- |

*FIG. 3*

MULTIPURPOSE POWER SUPPLY FOR POWER SWITCH DRIVER APPLICATIONS

BACKGROUND OF THE INVENTION

1. Field of the Invention

The present invention relates to a multipurpose power supply suitable for power switch driver applications, and in particular to a power switch driver power supply circuit that is capable of being used with multiple variants of power switch driver circuits.

2. Description of the Related Art

Power electronics devices, such as DC-to-DC converters and switched mode power supplies, make use of high power transistors in order to provide a stable output voltage at a predetermined value from a given input power supply, and the transistors are continually switched on and off to regulate the output voltage. They have important applications in switching high currents in uninterruptible power supplies, motor drives, and solar inverters, and must therefore meet stringent constraints and requirements imposed upon the output voltage they produce. For example, it may not be acceptable for the output voltage to deviate from a nominal value by more than a predetermined tolerance.

Power switch driver circuits are used to control the high power transistors in power electronics devices. The power switch driver circuit provides the electronics necessary to operate (that is, to switch on and off) the high power transistors as is appropriate given the input voltage to which the power electronics device is connected, and the voltage that is fed back from its output. By adjusting the time for which the transistors are switched on and off, the voltage output by the power converter can be regulated.

Several types of high power transistors are known, for example, the Isolated Gate Bipolar Transistor (IGBT), the Silicon Carbide (SIC) transistor, and the Metal Oxide Field Effect Transistor (MOSFET). Therefore several variants of power electronics devices are in use, each employing a particular type of high power transistor.

Typically, each type of high power transistor requires connection to supply a pair of voltage rails with a potential difference between them. In the commonly recognized industry standard, Isolated Gate Bipolar Transistors require connection to rails held at +15 V and −10 V; Silicon Carbide transistors require connection to rails held at +20 V and −5 V; and Metal Oxide Field Effect Transistors require connection to rails held at +15 V and −5 V.

For correct functioning of the power electronics devices, it is therefore necessary to provide their power switch driving circuits with a power supply that is suited to the particular type of transistors used within the device, and that is capable of outputting voltages such that a suitable potential difference is maintained between the voltage rails.

The inventors of the present invention appreciated that it is desirable to provide a single power supply for use with power electronics applications requiring a variety of input voltages.

SUMMARY OF THE INVENTION

A preferred embodiment of the present invention provides a power switch driver power supply circuit for use in providing power to a power electronics device including one or more transistors of the same type and high and low input power rails that provide the one or more transistors with power, the transistor type being MOSFET, SIC, or IGBT. The power switch driver power supply circuit includes: a pair of input terminals that receives input power; and four output terminals that output power to the power electronics device, wherein when an input voltage is applied across the input terminals, each of the four output terminals is held at a substantially different voltage relative to ground such that a first voltage difference exists between the first and second output terminals, a second voltage difference exists between the second and third output terminals, and a third voltage difference exists between the third and fourth output terminals. One of the four output terminals is connected to a reference voltage to set the values of the respective voltages at which the four output terminals are each held relative to ground; two of the remaining three output terminals are connected to the high and low input power rails of the power electronics device, thereby providing an input voltage difference across them; and the selection of the three output terminals to be connected to the reference voltage and the high and low input power rails of the power electronics device from among the four output terminals selects different combinations of the first, second, and third voltage difference to change the input voltage difference provided across the high and low input power rails according to whether the transistor type is MOSFET, SIC, or IGBT.

The first voltage difference may be substantially equal to 15 V, the second voltage difference may be substantially equal to 5 V, and the third voltage difference may be substantially equal to 5 V, for example.

The reference voltage may be a ground voltage.

When the transistor type is IGBT, the first output terminal is held substantially at +15 V relative to ground and is connected to the high input power rail of the power electronics device, the second output terminal is connected to the reference voltage, and the fourth output terminal is held substantially at −10 V relative to ground and is connected to the low input power rail of the power electronics device; when the transistor type is SIC, the first output terminal is held substantially at +20 V relative to ground and is connected to the high input power rail of the power electronics device, the third output terminal is connected to the reference voltage, and the fourth output terminal is held substantially at −5 V relative to ground and is connected to the low input power rail of the power electronics device; and when the transistor type is MOSFET, the first output terminal is held substantially at +15 V relative to ground and is connected to the high input power rail of the power electronics device, the second output terminal is connected to the reference voltage, and the third output terminal is held substantially at −5 V relative to ground and is connected to the low input power rail of the power electronics device, for example.

The power switch driver power supply circuit may further include a transformer, the transformer including a primary winding across which the input voltage is applied, and a plurality of secondary windings operating to set the voltages of the four output terminals relative to each other when an input voltage is applied across the input terminals.

The power switch driver power supply circuit may include three output stages, each output stage including: a secondary winding; a diode provided in series with the secondary winding; and a capacitor provided in parallel with the secondary winding. A first terminal of the capacitor is connected to a first terminal of the output stage, and a second terminal of the capacitor is connected to a second terminal of the output stage.

In use, two pairs of terminals of the six terminals including the first and second terminals of each of the three output stages are connected together to provide two of the four output terminals.

The number of secondary windings may be one less than the number of output terminals.

A preferred embodiment of the present invention provides a system including: a power electronics device including one or more transistors of the same type and high and low input power rails that provide the one or more transistors with power, the transistor type being MOSFET, SIC, or IGBT; a power switch driver power supply circuit that provides power to the power electronics device, including: a pair of input terminals that receive input power; and four output terminals that output power to the power electronics device, wherein when an input voltage is applied across the input terminals, each of the four output terminals is held at a substantially different voltage relative to ground such that a first voltage difference exists between the first and second output terminals, a second voltage difference exists between the second and third output terminals, and a third voltage difference exists between the third and fourth output terminals. In use: one of the four output terminals is connected to a reference voltage to set the values of the respective voltages at which the four output terminals are each held relative to ground; two of the remaining three output terminals are connected to the high and low input power rails of the power electronics device, thereby providing an input voltage difference across them; and the selection of the three output terminals to be connected to the reference voltage and the high and low power rails of the power input electronics device from among the four output terminals selects different combinations of the first, second, and third voltage differences to change the input voltage difference provided across the high and low input power rails according to whether the transistor type is MOSFET, SIC, or IGBT.

A preferred embodiment of the present invention provides a method of supplying power from a power switch driver power supply circuit to a power electronics device including one or more transistors of the same type and high and low input power rails that provide the one or more transistors with power, the transistor type being MOSFET, SIC, or IGBT. The method includes: providing a power switch driver power supply circuit including: a pair of input terminals that receive input power; and four output terminals that output power to the power electronics device, wherein when an input voltage is applied across the input terminals, each of the four output terminals is held at a substantially different voltage relative to ground such that a first voltage difference exists between the first and second output terminals, a second voltage difference exists between the second and third output terminals, and a third voltage difference exists between the third and fourth output terminals; selecting three output terminals to be connected to a reference voltage and the high and low input power rails of the power electronics device from among the four output terminals, thereby selecting a combination of the first, second, and third voltage differences that provide an input voltage difference across the high and low input power rails according to whether the transistor type is MOSFET, SIC, or IGBT; connecting the reference voltage to the selected output terminal to set the values of the respective voltages at which the four output terminals are each held relative to ground; and connecting the high and low input power rails of the power electronics device to the selected output terminals to provide the input voltage difference across them.

A preferred embodiment of the present invention provides a system including a power supply and a power electronics device, the power supply including: a first output stage to produce a first voltage; a second output stage to produce a second voltage; a third output stage to produce a third voltage; a first output terminal connected to a first side of the first output stage; a second output terminal connected to a second side of the first output stage and connected to a first side of the second output stage; a third output terminal connected to a second side of the second output stage and connected to a first side of the third output stage; and a fourth output terminal connected to a second side of the third output stage; and the power electronics device including a transistor; wherein one terminal selected from the first output terminals through the fourth output terminals is connected to ground; two terminals selected from the first output terminals through the fourth output terminals are connected to the transistor, supplying a positive voltage and a negative voltage to the transistor; and one terminal selected from the first output terminals through the fourth output terminals is unconnected.

A preferred embodiment of the present invention provides a system including a power supply and a power electronics device, the power supply including: a first output stage to produce a first voltage; a second output stage to produce a second voltage; a third output stage to produce a third voltage; a first output terminal connected to a first side of the first output stage; a second output terminal connected to a second side of the first output stage; a third output terminal connected to a first side of the second output stage; a fourth output terminal connected to a second side of the second output stage; a fifth output terminal connected to a first side of the third output stage; and a sixth output terminal connected to a second side of the third output stage; and the power electronics device including a transistor; wherein two terminals selected from the first, the third and the fifth output terminals and two terminals selected from the second, the fourth and the sixth output terminals are respectively connected outside the power supply to form a first external terminal and a second external terminal, the unselected two terminals being defined as a first on-device terminal and a second on-device terminal; one terminal selected from the first external terminal, the second external terminal, the first on-device terminal and the second on-device terminal is connected to ground, two terminals selected from the first external terminal, the second external terminal, the first on-device terminal and the second on-device terminal are connected to the transistor, supplying a pair of a positive voltage and a negative voltage to the transistor, one terminal selected from the first external terminal, the second external terminal, the first on-device terminal and the second on-device terminal is not connected to outside.

A preferred embodiment of the present invention provides a method of supplying power from a power supply circuit to different types of transistors including: a) providing a power supply circuit including: a first output stage to produce a first voltage; a second output stage to produce a second voltage; a third output stage to produce a third voltage; a first output terminal connected to a first side of the first output stage; a second output terminal connected to a second side of the first output stage and connected to a first side of the second output stage; a third output terminal connected to a second side of the second output stage and connected to a first side of the third output stage; and a fourth output terminal connected to a second side of the third output stage; b) determining a positive terminal, a ground terminal, a negative terminal, and a non-connecting terminal among the first output terminal through the fourth output terminal so as to provide a positive voltage and a negative voltage suitable for a selected transistor; and c) connecting the positive terminal and the negative terminal to the selected transistor and connecting the ground terminal to ground so as to supply the positive and negative voltages to the selected transistor.

Step b) may include: determining that the first output terminal is the positive terminal; determining the ground terminal, the negative terminal and the non-connecting terminal based on the following conditions; i) for a first selected transistor, the second output terminal is the ground terminal, the third output terminal is the non-connecting terminal, and the fourth output terminal is the negative terminal so as to provide the positive voltage equal to the first voltage and the negative voltage equal to the sum of the second voltage and the third voltage, ii) for a second selected transistor, the second output terminal is the non-connecting terminal, the third output terminal is the ground terminal, and the fourth output terminal is the negative terminal so as to provide the positive voltage equal to the sum of the first voltage and the second voltage and the negative voltage equal to the third voltage, and iii) for a third selected transistor, the second output terminal is the ground terminal, the third output terminal is the negative terminal, and the fourth output terminal is the non-connecting terminal so as to provide the positive voltage equal to the first voltage and the negative voltage equal to the second voltage.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIG. 3 illustrates connections to the output terminals of a power supply.

DETAILED DESCRIPTION OF PREFERRED EMBODIMENTS

Figure 1:
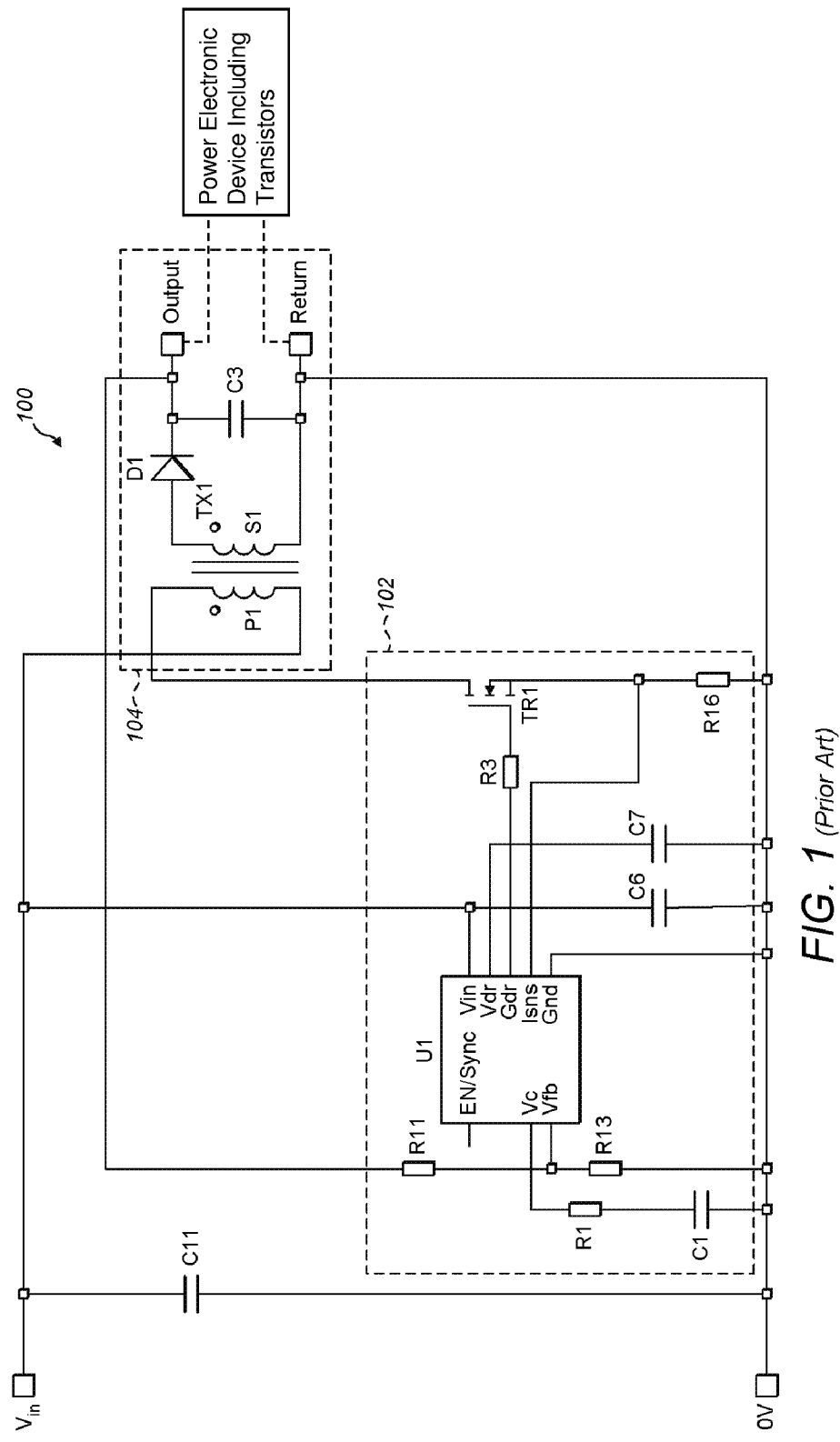
FIG. 1 illustrates a known DC-to-DC converter.

FIG. 1 illustrates a known DC-to-DC converter. For the purposes of illustration, a flyback converter is shown, but other topologies of converter, such as a forward converter, would also be acceptable for use in such a circuit.

The converter 100 accepts an input voltage $V_{in}$ relative to the 0 V rail. The remaining circuitry is, for the purposes of description, conveniently divided into two sections: switching circuitry 102 and converter circuitry 104.

The input voltage $V_{in}$ is switched across the converter circuitry 104 by switching circuitry 102. In FIG. 1 the switching circuitry includes a Metal Oxide Field Effect Transistor (MOSFET) TR1 which is controlled to either be in a conducting or non-conducting state. When the transistor TR1 in switching circuitry 102 is conducting, the input voltage $V_{in}$ is applied across the primary windings P1 of a transformer TX1 in the converter circuitry 104, and energy is thereby stored in the transformer TX1 in the resulting magnetic field. When the transistor TR1 in switching circuitry 102 is non-conducting, a current is allowed to flow through the secondary windings S1 of the transformer TX1 and results in a converted DC voltage being applied between the OUTPUT and RETURN terminals. The converted voltage is then used to supply, for example, transistors in switched-mode power supplies or power electronics devices.

Switching circuitry 102 includes a Pulse Width Modulation (PWM) controller U1 which is used to provide a switching signal to the primary windings P1 via MOSFET TR1. Such a PWM controller may be provided as part of an integrated circuit (IC) incorporated within the circuitry depicted in FIG. 1. Transistor TR1 is the primary side switching MOSFET and switches the input voltage $V_{in}$ across the primary windings P1 of the transformer TX1 in response to signals output by the PWM controller. The drain of transistor TR1 is connected to the primary windings P1, and the source is connected in series to resistor R16 and then to the 0 V (ground) power rail. Transistor TR1 as shown in FIG. 1 is an Enhancement-mode N-channel MOSFET, although other transistor types can be used.

Converter circuitry 104 includes a flyback transformer TX1, having primary windings P1 and secondary windings S1. The primary and secondary windings P1 and S1 are wound around a transformer core, for example one made of laminated soft iron. In alternative arrangements, it is possible to use other materials for the core, or the core may be absent in which case the windings are air-cored. The transformer of FIG. 1 is not isolated because the voltage at the RETURN terminal is fed back to the switching circuitry 102, but an isolated transformer without this feedback could equally well be used. Diode D1 and capacitor C3 are the respective output components for the output side.

Capacitor C11 connects between the input voltage terminal and ground, and acts to smooth out any variations present within the input voltage.

The PWM controller U1 illustrated in FIG. 1 will now be described in more detail. In this example, the PWM controller is provided as an integrated circuit. As will be appreciated by the skilled person, other PWM controllers could be used. The IC shown has a Gate Drive (Gdr) terminal which connects to the gate of MOSFET TR1 via series resistor R3. Resistor R3 can be used to tailor the electromagnetic compatibility (EMC) of the device. The input pin (Isns) is connected to a point between resistor R16 and the source terminal of TR1. The input pin Isns is a current sense input for the PWM controller. This pin is connected to the source of the external MOSFET, and through current sense resistor R16 to ground. The input pin Isns allows sensing of the switching current for regulation and current timing. The Vc pin provides an output from the internal voltage error amplifier of the PWM controller. The Vc pin connects to ground via series resistor R1 and capacitor C1. Resistor R1 and capacitor C1 define an external compensator network to stabilize the converter 100. The Vin pin is connected to the high voltage rail ($V_{in}$) directly and to the 0 V or low voltage rail via a capacitor C6. The ground pin (Gnd) is connected directly to ground. The driving voltage pin (Vdr) is shown as bypassed in this configuration, being connected to ground by capacitor C7, which can be, for example, 1.0 µF. The Enable and Synchronization Terminal (EN/Sync), when connected, allows an oscillating input signal to be applied to the PWM controller U1, and the falling edge of such an input signal synchronizes the PWM controller's internal oscillator. Lastly, the Vfb pin is for output voltage feedback. The Vfb pin connects via resistor R11 to the output voltage, and via resistor R13 to ground. The resistor configuration creates a voltage divider that performs regulation and setting of the output voltage. Other IC circuits that may be used as PWM controllers may have these or different input pins for control and sensing and output.

Figure 2:
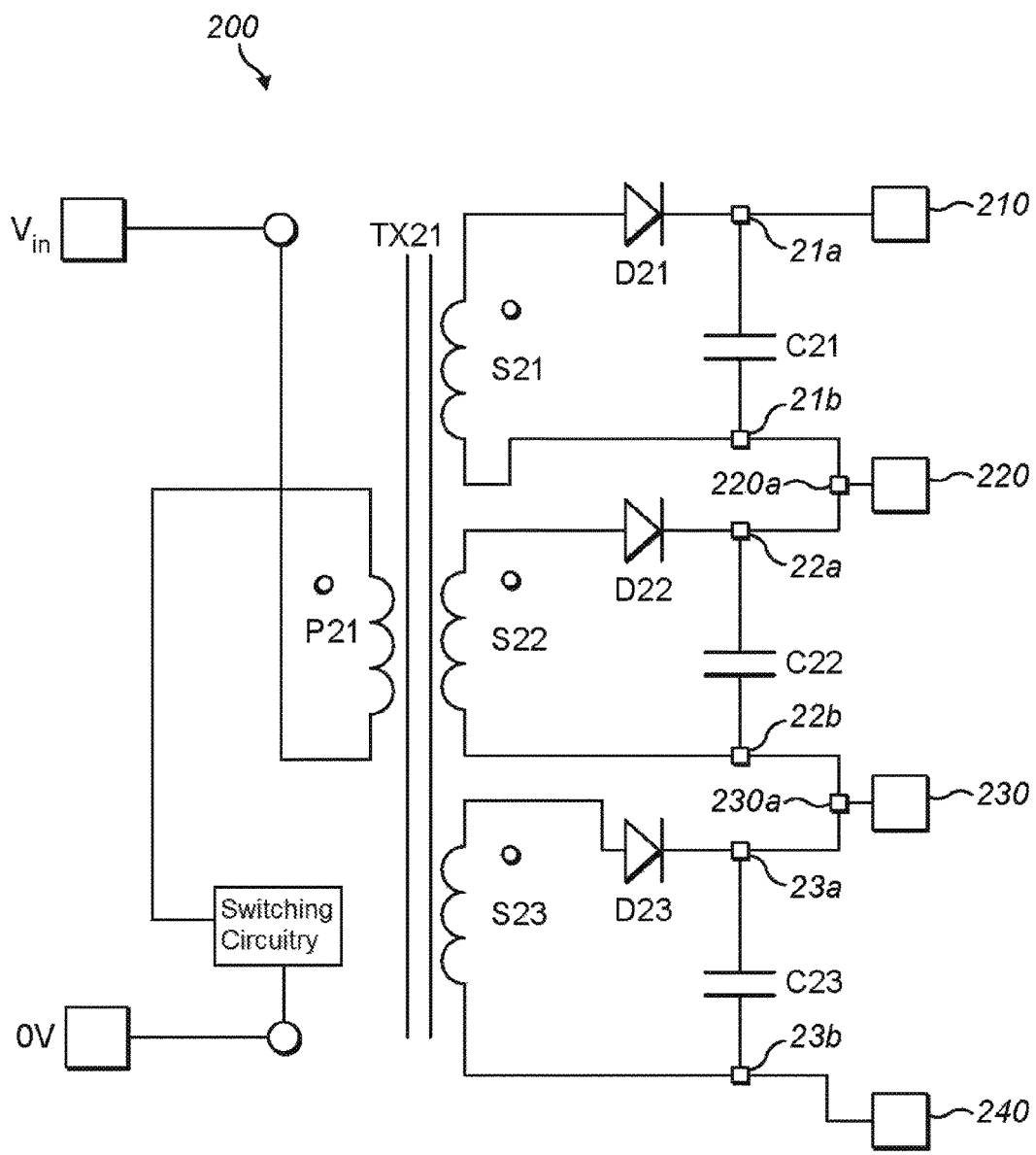
FIG. 2 illustrates a power supply with multiple outputs.

FIG. 2 illustrates a preferred embodiment of the power supply 200 output stage according to the present invention. An input voltage $V_{in}$ is provided to the power supply from a battery or DC source. Although the voltage input is only shown schematically in FIG. 2, in use it enables a current to be driven through the primary windings P21 of transformer TX21 when the switching circuitry, which is provided in series with the primary windings P21 and the input voltage $V_{in}$ and 0 V terminals, is conducting. A capacitor may be provided between the high ($V_{in}$) and low (0 V) voltage rails (not shown in FIG. 2).

Three secondary windings S21, S22, and S23 are provided on the core of the transformer TX21, providing three separate stages of output voltage arranged in a ladder configuration. The voltage drop across the combined secondary windings is therefore divided across each of the windings S21, S22, and S23. The secondary windings S21, S22, S23 may be physically positioned in such a way as to not overlap, and are provided in series with one another with respect to the magnetic circuit made by the flux in the transformer core. In alternative preferred embodiments, the secondary windings can interpenetrate or overlap with one another on the transformer core, provided that each secondary winding remains electrically isolated from the others at the core itself.

The first secondary winding S21 is provided at a first end of the transformer core. One end of secondary winding S21 is electrically connected to one terminal of diode D21, and the other terminal of the diode D21 is connected to node 21a. Node 21a is connected to first output terminal 210. Diode D21 is forward biased between the secondary winding and the first output terminal, as shown in FIG. 2. The other end of secondary winding S21 is electrically connected to node 21b. A capacitor C21 is connected between nodes 21a and 21b so as to be in parallel with the combined secondary winding and diode unit including S21 with D21. Node 21b is connected to the second output terminal 220.

The second secondary winding S22, provided in the middle of the transformer core, is similarly arranged. One end of the secondary winding S22 is connected to one terminal of diode D22, and the other terminal of diode D22 is connected to node 22a. Node 22a is connected to second output terminal 220. The diode D22 is forward biased between the second secondary winding S22 and the second output terminal 220, as shown in FIG. 2. The other end of secondary winding S22 is connected to node 22b. Capacitor C22 is connected between nodes 22a and 22b so as to be in parallel with the combined secondary winding and diode unit including S22 with D22. Node 22b is connected to third output terminal 230.

The third secondary winding S23, provided at a second end of the transformer core, is also similarly arranged. One end of the secondary winding S23 is connected to one terminal of diode D23, and the other terminal of diode D23 is connected to node 23a. Node 23a is connected to third output terminal 230, and the diode D23 is forward biased between the third secondary winding and the third output terminal, as shown in FIG. 2. The other end of secondary winding S23 is connected to node 23b. Capacitor C23 is connected between nodes 23a and 23b so as to be in parallel with the combined secondary winding and diode unit including S23 with D23. Node 23b is connected to fourth output terminal 240. The number of secondary windings on the transformer core is therefore one less than the number of output terminals.

The diodes D21, D22, D23 fix the direction of current able to circulate through the secondary windings S21, S21, S23 and into the capacitors C21, C22, C23. The capacitors C21, C22, C23 store and release energy in the form of a time-varying electric field set up between the capacitor terminals. In so doing, they supply energy when no current is present in the secondary windings S21, S22, S23, and store energy when such a current is present.

The capacitors in parallel with the secondary windings at either end of the transformer TX21, namely C21 and C23, have one terminal connected to output terminals 210 and 240, respectively. Thus, output terminal 210 is connected to node 21a, and output terminal 240 is connected to node 23b. The remaining pairs of adjacent capacitor terminals are connected together as illustrated in FIG. 2. The second terminal of capacitor C21 is connected to the first terminal of capacitor C22, and the second terminal of capacitor C22 is connected to the remaining terminal of capacitor C23. Output terminals 220 and 230 are provided where these adjacent capacitor terminals meet. This arrangement is achieved by connecting both of the nodes 21b and 22a to another node 220a, and also by connecting both the nodes 22b and 23a to another node 230a. Node 220a is then connected to output terminal 220, and node 230a is connected to output terminal 230.

When the primary windings P21 of transformer TX21 are connected to the input voltage by the switching circuit 102, the current driven through primary windings P21 by the applied voltage $V_{in}$ sets up a magnetic field in the transformer, and changes in the magnetic field with respect to time induce a potential difference across each of the secondary windings S21, S22, and S23. For an ideal transformer, the voltage induced in each of the secondary windings is proportional to the number of turns in the secondary winding, and the combined voltage induced in the secondary windings may be set by the ratio of the number of turns on the primary windings to the total number of turns on the secondary windings. Energy is stored in the transformer in the magnetic flux passing through the core, and although a voltage is induced across each of the secondary windings, no current is able to flow through them due to the diodes D21, D22, D23 which are reverse-biased. Therefore, when the primary windings P21 are energized, electrical loads connected between any pairs of the output terminals 210, 220, 230, 240 are supplied by energy stored in the appropriate capacitors C21, C22, C23.

When the primary windings P21 are disconnected from the input voltage by the switching circuit 102, the current circulating in them, and therefore the magnetic flux passing through these windings, falls to zero. The secondary windings S21, S22, and S23 react to this change in magnetic flux by setting up an opposing voltage, which drives a current to pass through the secondary coils as the diodes D21, D22, D23 are now forward-biased. This current charges the capacitors C21, C22, C23 and simultaneously supplies any electrical loads connected between any pairs of the output terminals 210, 220, 230, 240. Therefore energy is transferred from the field of the transformer TX21 to the capacitors C21, C22, C23 as well as to any electrical loads connected between the output terminals 210, 220, 230 and 240.

As the switching circuitry cyclically switches the input voltage on and off thereby alternatively energizing and de-energizing the primary windings P21 of transformer TX21, the output terminals 210, 220, 230, 240 are held at a potential alternatively by the charge stored in the capacitors C21, C22, C23 or by the opposing voltages set up in the secondary windings S21, S22, S23. The capacitors C21, C22, C23 act to reduce the variations in the voltage applied across any pair of the output terminals 210, 220, 230, 240 which result from this cycling, providing an output voltage that may be treated as a constant DC output. When the capacitances and switching times (or duty cycle of the switch) are correctly adjusted, a predetermined and substantially constant voltage is therefore provided between each pair of the output terminals 210, 220, 230, 240.

Further, when a reference voltage is applied to one of the output terminals 210, 220, 230, 240, the remaining output terminals adjust themselves relative to this voltage in response to the magnetic flux passing through the windings, as all of the secondary windings S21, S22, S23 are provided on a common core of the transformer. Such a reference voltage may conveniently be chosen to be 0 V by connecting the relevant output terminal to the ground rail. In practice, therefore, adjacent output stages of the power supply output stage 200 may be connected to a common ground which is applied at the output terminal intermediate the adjacent output stages, for example output terminals 220 or 230.

If it is desired to output a voltage of opposite polarity across the output terminals, this can be achieved at the design stage by giving the relevant secondary windings the opposite polarity and changing the direction of forward bias of the in-series diode. Further, more output stages could be provided to the arrangement of FIG. 2, with each extra secondary winding positioned in series with a diode and in parallel with a capacitor as is shown for those secondary windings in the FIG. 2 arrangement. For each extra secondary winding an extra output terminal can be provided.

In the preferred embodiment of FIG. 2 the transformer TX21 including secondary windings S21, S22, and S23 defines part of a flyback converter with multiple secondary windings. However, other isolated power supply topologies, such as a forward converter, could be used.

Although it is not shown in FIG. 2, feedback can be provided to improve the stability of the power supply output. Such feedback may originate from the output voltages across any or all of the secondary conductors S21, S22, S23, and may be communicated to switching circuitry (not shown in FIG. 2) either by a direct electrical connection or by an electrically isolated route such as via an opto-coupler. The switching circuitry can, for example, use a PWM controller as described above with relation to FIG. 1 to process the feedback signals and adjust the behavior of the switching element (for example, the transistor) accordingly.

In a preferred embodiment of the present invention, each of the output terminals is held at a substantially different voltage relative to ground, with a first voltage difference between the first 210 and second 220 output terminals, a second voltage difference between the second 220 and third 230 output terminals, and a third voltage difference between the third 230 and fourth 240 output terminals. The components are arranged such that the first output terminal 210 is at a potential 15 V above that of the second output terminal 220, and also such that second output terminal 220 is at a potential 5 V above that of the third output terminal 230, and further such that the third output terminal 230 is at a potential 5 V above that of the fourth output terminal 240. This is illustrated in FIG. 3, the first (leftmost) column of which shows the output terminals 210, 220, 230, and 240, together with the relative potential differences between them. Note that the output terminals shown in FIG. 3 are identical to the similarly labelled output terminals shown in FIG. 2. In this way the three secondary windings S21, S22, and S23 act as voltage dividers, with a combined voltage drop across all of the secondary windings of 25 V.

To obtain the voltages differences between the output terminals as illustrated in FIG. 3, the numbers of turns $N_{S21}$, $N_{S22}$, $N_{S23}$ respectively on the secondary windings S21, S22, S23 must be related by $N_{S21}=3N_{S22}$ and $N_{S22}=N_{S23}$. The capacitance of capacitors C21, C22, and C23 will depend upon factors such as the output current and switching frequency. As an example, the capacitors may be given values of C21=10 µF, C22=33 µF, and C23=33 µF.

With this arrangement a variety of supply voltages can be provided. This is achieved by connecting one of the four output terminals to a reference voltage to set the values of the respective voltages at which the four output terminals are each held relative to ground. In this case, the reference voltage is 0 V although other references voltage values can be used. Therefore, as illustrated in the second column of FIG. 3, if the 0 V reference voltage is connected to output terminal 220, output terminal 210 provides a voltage of +15 V, and output terminal 240 provides a voltage of −10 V relative to ground. These two output terminals 210, 240 can be used to provide the power supply needs for an IGBT switch driver by connecting output terminals 210 and 240 to respective high and low input power rails of the power electronics device. The remaining node 230 is not used and no connection is made to this node in this configuration.

Alternatively, as illustrated in the third column of FIG. 3, if the 0 V reference voltage is connected to output terminal 230, output terminal 210 provides a voltage of +20 V, and output terminal 240 provides a voltage of −5 V relative to ground. These two output terminals 210, 240 can be used to provide the power supply needs for a SIC switch driver by connecting output terminals 210 and 240 to respective voltage rails. The remaining output terminal 220 is not used in this configuration.

A further alternative is illustrated in the fourth (rightmost) column of FIG. 3. If the 0 V reference voltage is connected to output terminal 220, output terminal 210 provides a voltage of +15 V and output terminal 230 provides a voltage of −5 V relative to ground. These two output terminals 210, 230 can be used to provide the power supply needs for a MOSFET switch driver by connecting output terminals 210 and 230 to respective voltage rails. The remaining output terminal 240 is not used in this configuration.

As a result of the output stage configuration described above, the same power supply is able to provide output voltages for IGBT, SIC, and MOSFET switches depending on the output terminals to which the voltage rails are connected, and the output terminal which is connected to the ground reference. Therefore, the selection of the three output terminals to be connected to the reference voltage and the high and low input power rails selects different combinations of the first, second, and third voltage differences to change the voltage provided across the power rails. It is straightforward to reconfigure the power supply for a different variant of switched-mode power converter or power electronics device by adjusting the connections to the output terminals.

In all three of these configurations, the same basic power supply is used, taking the same the input voltage, and employing the same switching circuitry, transformer, and primary and secondary windings. The electrical components, such as the diodes and capacitors, have the same values. Such an arrangement therefore improves the efficiency of production of the power supplies, as it is necessary to provide qualification testing only on a single power supply rather than on a plurality of separate power supplies to be used with each switch driver variant employing different types of transistors.

In addition, the time to market is decreased compared to conventional switch driver power supplies because only a single type of power supply, compatible for use with all switch driver variants, needs to be developed. Furthermore, costs relating to manufacturing are reduced because the same process is used throughout to produce identical power supplies, instead of manufacturing different power supplies for different variants. Costs associated with marketing the power supplies are also reduced because the power supply is universally suitable for all switch driver variants, and can therefore be targeted across the breadth of the market, compared to the case where three or more separate power supplies are produced, each requiring targeting towards specific users.

There are also other permutations of output connection voltages that can be derived from the power supply of the present preferred embodiment. For example, if the 0 V reference voltage is applied to output terminal 240 then the power supply can provide voltages of +25 V, +10 V, and +5 V at output terminal 210, 220, and 230 respectively. If the 0 V reference voltage is applied to output terminal 210 then the power supply can provide voltages of −15 V, −20 V, and −25 V at nodes 220, 230, and 240 respectively. Although these voltages are not commonly recognized voltages for power switch drivers, a power supply capable of outputting these voltages may still be of use in other applications.

Figure 4:
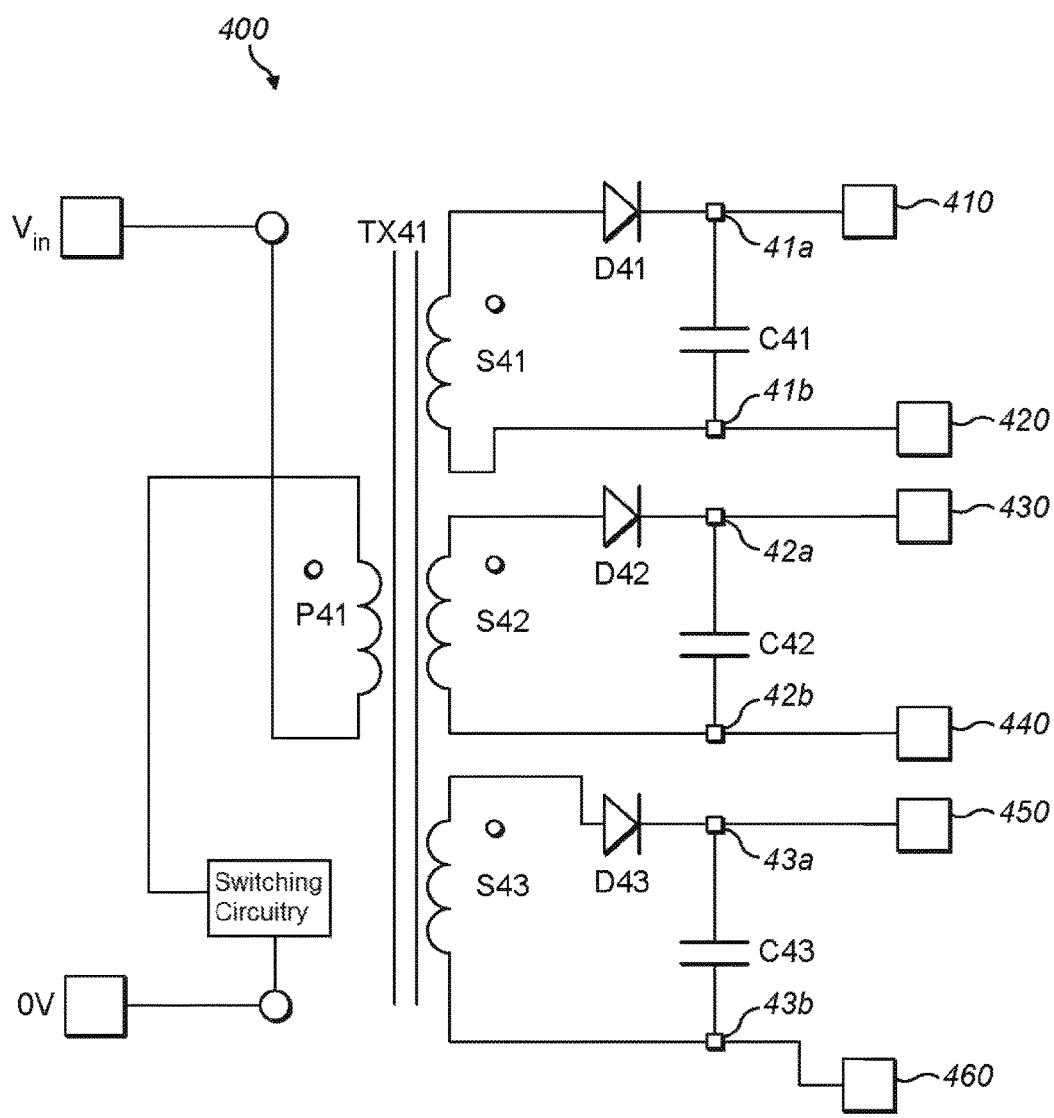
FIG. 4 illustrates a power supply with multiple outputs according to another preferred embodiment of the present invention.

Another preferred embodiment of the present invention is illustrated by the power supply 400 in FIG. 4. An input voltage $V_{in}$ is provided to the power supply 400 from a battery or DC source. As with FIG. 2, although this input voltage is only shown schematically in FIG. 4, in use it drives a current through the primary windings P41 of transformer TX41 when switching circuitry, which is provided in series with the primary windings P41 and the input voltage $V_{in}$ terminals, is conducting. Note that a capacitor may be provided between the high ($V_{in}$) and low (0 V) voltage rails (not shown in FIG. 4). Three secondary windings S41, S42, S43 are provided on transformer TX41.

The first secondary winding S41 is provided at a first end of the transformer core. One end of secondary winding S41 is electrically connected to one terminal of diode D41, and the other terminal of diode D41 is connected to node 41a. Node 41a is connected to first output terminal 410. Diode D41 is forward biased between the secondary winding S41 and the first output terminal, as shown in FIG. 4. Diode D41 is biased in the direction shown in FIG. 4. The other end of secondary winding S41 is electrically connected to node 41b. A capacitor C41 is connected between nodes 41a and 41b so as to be in parallel with the combined secondary winding and diode unit including S41 with D41. Node 41a is connected to output terminal 410, and node 41b is connected to output terminal 420.

The second secondary winding S42, provided in the middle of the transformer core, is similarly arranged. Thus one end of secondary winding S42 is connected to one terminal of diode D42, and the other terminal of diode D42 is connected to node 42a. Node 42a is connected to output terminal 430. Diode D42 is forward biased between the secondary winding S42 and the output terminal 430, as shown in FIG. 4. The other end of secondary winding S42 is connected to node 42b. Capacitor C42 is connected between nodes 42a and 42b so as to be in parallel with the combined secondary winding and diode unit including S42 with D42. Node 42a is connected to output terminal 430, and node 42b is connected to output terminal 440.

The third secondary winding S43, provided at a second end of the transformer core, is also similarly arranged. Thus one end of secondary winding S43 is connected to one terminal of diode D43, and the other terminal of diode D43 is connected to node 43a. Node 43a is connected to output terminal 450. Diode D21 is forward biased between the secondary winding S43 and the output terminal 450, as shown in FIG. 4. The other end of secondary winding S43 is connected to node 43b. Capacitor C43 is connected between nodes 43a and 43b so as to be in parallel with the combined secondary winding and diode unit including S43 with D43. Node 43a is connected to output terminal 450, and node 43b is connected to output terminal 460.

The six separate output terminals 410, 420, 430, 440, 450, 460 provided in this preferred embodiment allow increased flexibility as to how the output terminals can be connected to obtain the desired supply voltages. For example, different reference voltages can be applied to different output terminals, with the result that the voltages relative to ground at the other output terminal for that stage is modified. Further, by connecting two or more of the output terminals to the same reference voltage or to each other, a partial ladder arrangement like that shown in FIG. 2 could be recreated. However, in such a preferred embodiment, the power supply will require more connection pins and may therefore be of a larger physical size, and will also require more complex connectivity for use.

The preferred embodiments described above are not limited to power supplies for power electronics employing IGBT, SIC, or MOSFET technology but may be readily used with other power switching technologies such as Gallium Arsenide devices.

Various modifications to the preferred embodiments described above are possible and will occur to those skilled in the art without departing from the scope of the invention which is defined by the following claims.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

The invention claimed is:

1. A power switch driver power supply circuit for use in providing power to a power electronics device including one or more transistors of the same type and high and low input power rails that provide the one or more transistors with power, the transistor type being MOSFET, SIC, or IGBT, the power switch driver power supply circuit comprising:
   a pair of input terminals that receive input power; and
   four output terminals that output power to the power electronics device; wherein
   when an input voltage is applied across the input terminals, each of the four output terminals is held at a substantially different voltage relative to ground such that a first voltage difference exists between the first and second output terminals, a second voltage difference exists between the second and third output terminals, and a third voltage difference exists between the third and fourth output terminals;
   one of the four output terminals is connected to a ground voltage to provide an output terminal that is held at the ground voltage and to set the values of the respective voltages at which the four output terminals are each held relative to ground;

two of the remaining three output terminals are connected to the high and low input power rails of the power electronics device to provide an output terminal that is held at a voltage above the ground voltage and an output terminal that is held at a voltage below the ground voltage;

the selection of the three output terminals to be connected to the ground voltage and the high and low input power rails of the power electronics device from among the four output terminals includes selecting different combinations of the first, second, and third voltage differences to change the input voltage difference provided across the high and low input power rails;

the selection of the three output terminals to be connected to the ground voltage and the high and low input power rails of the power electronics device from among the four output terminals is performed according to whether the transistor type is MOSFET, SIC, or IGBT.

2. The power switch driver power supply circuit of claim 1, wherein the first voltage difference is substantially equal to 15 V, the second voltage difference is substantially equal to 5 V, and the third voltage difference is substantially equal to 5 V.

3. The power switch driver power supply circuit of claim 1, wherein:

when the transistor type is IGBT, the first output terminal is held substantially at +15 V relative to ground and is connected to the high input power rail of the power electronics device, the second output terminal is connected to the ground voltage, and the fourth output terminal is held substantially at −10 V relative to ground and is connected to the low input power rail of the power electronics device;

when the transistor type is SIC, the first output terminal is held substantially at +20 V relative to ground and is connected to the high input power rail of the power electronics device, the third output terminal is connected to the ground voltage, and the fourth output terminal is held substantially at −5 V relative to ground and is connected to the low input power rail of the power electronics device; and when the transistor type is MOSFET, the first output terminal is held substantially at +15 V relative to ground and is connected to the high input power rail of the power electronics device, the second output terminal is connected to the ground voltage, and the third output terminal is held substantially at −5 V relative to ground and is connected to the low input power rail of the power electronics device.

4. The power switch driver power supply circuit of claim 1, further comprising a transformer, the transformer including:

a primary winding across which the input voltage is applied; and a plurality of secondary windings operating to set the voltages of the four output terminals relative to each other when the input voltage is applied across the input terminals.

5. The power switch driver power supply circuit of claim 4, further comprising three output stages, each of the three output stages including:

a secondary winding;

a diode provided in series with the secondary winding; and a capacitor provided in parallel with the secondary winding; wherein a first terminal of the capacitor is connected to a first terminal of the output stage; and a second terminal of the capacitor is connected to a second terminal of the output stage.

6. The power switch driver power supply circuit of claim 5, wherein:

two pairs of terminals of the six terminals comprising the first and second terminals of each of the three output stages are connected together to provide two of the four output terminals.

7. The power switch driver power supply circuit of claim 4, wherein a number of secondary windings is one less than a number of output terminals.

8. A system comprising:

a power electronics device including one or more transistors of the same type and high and low input power rails that provide the one or more transistors with power, the transistor type being MOSFET, SIC, or IGBT;

a power switch driver power supply circuit that provides power to the power electronics device, comprising:

a pair of input terminals that receive input power; and four output terminals that output power to the power electronics device, wherein when an input voltage is applied across the input terminals, each of the four output terminals is held at a substantially different voltage relative to ground such that a first voltage difference exists between the first and second output terminals, a second voltage difference exists between the second and third output terminals, and a third voltage difference exists between the third and fourth output terminals; wherein one of the four output terminals is connected to a ground voltage to provide an output terminal that is held at the ground voltage and to set the values of the respective voltages at which the four output terminals are each held relative to ground;

two of the remaining three output terminals are connected to the high and low input power rails of the power electronics device to provide an output terminal that is held at a voltage above the ground voltage and an output terminal that is held at a voltage below the ground voltage;

the selection of the three output terminals to be connected to the ground voltage and the high and low input power rails of the power electronics device from among the four output terminals includes selecting different combinations of the first, second, and third voltage differences to change the input voltage difference provided across the high and low input power rails;

the selection of the three output terminals to be connected to the ground voltage and the high and low input power rails of the power electronics device from among the four output terminals is performed according to whether the transistor type is MOSFET, SIC, or IGBT.

9. The system of claim 8, wherein the first voltage difference is substantially equal to 15 V, the second voltage difference is substantially equal to 5 V, and the third voltage difference is substantially equal to 5 V.

10. The system of claim 8, wherein:

when the transistor type is IGBT, the first output terminal is held substantially at +15 V relative to ground and is connected to the high input power rail of the power electronics device, the second output terminal is connected to the ground voltage, and the fourth output terminal is held substantially at −10 V relative to ground and is connected to the low input power rail of the power electronics device;

when the transistor type is SIC, the first output terminal is held substantially at +20 V relative to ground and is connected to the high input power rail of the power electronics device, the third output terminal is connected to the ground voltage, and the fourth output terminal is held substantially at −5 V relative to ground and is connected to the low input power rail of the power electronics device; and when the transistor type is MOSFET, the first output terminal is held substantially at +15 V relative to ground and is connected to the high input power rail of the power electronics device, the second output terminal is connected to the ground voltage, and the third output terminal is held substantially at −5 V relative to ground and is connected to the low input power rail of the power electronics device.

11. The system of claim 8, wherein the power switch driver power supply circuit further includes a transformer, the transformer including:
a primary winding across which the input voltage is applied; and
a plurality of secondary windings operating to set the voltages of the four output terminals relative to each other when the input voltage is applied across the input terminals.

12. The system of claim 11, wherein the power switch driver power supply circuit further includes three output stages, each of the three output stages comprising:
a secondary winding;
a diode provided in series with the secondary winding; and
a capacitor provided in parallel with the secondary winding; wherein
a first terminal of the capacitor is connected to a first terminal of the output stage; and
a second terminal of the capacitor is connected to a second terminal of the output stage.

13. The system of claim 12, wherein:
two pairs of terminals of the six terminals comprising the first and second terminals of each of the three output stages are connected together to provide two of the four output terminals.

14. The system of claim 11, wherein a number of secondary windings is one less than a number of output terminals.

* * * * *